Feb. 16, 1960 E. D. FLETCHER 2,925,247
VALVES
Filed Aug. 22, 1956 2 Sheets-Sheet 1
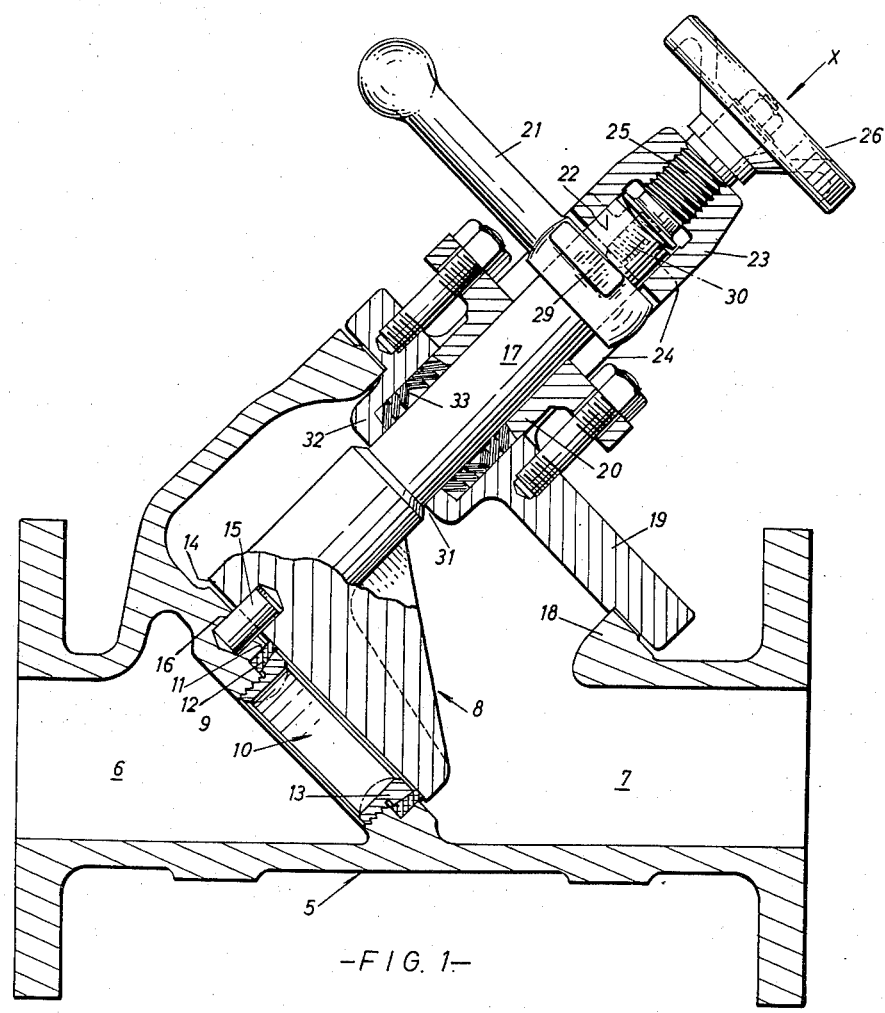
—FIG. 1—
Inventor
Edward D. Fletcher
By
Attorney Feb. 16, 1960  E. D. FLETCHER  2,925,247
VALVES
Filed Aug. 22, 1956
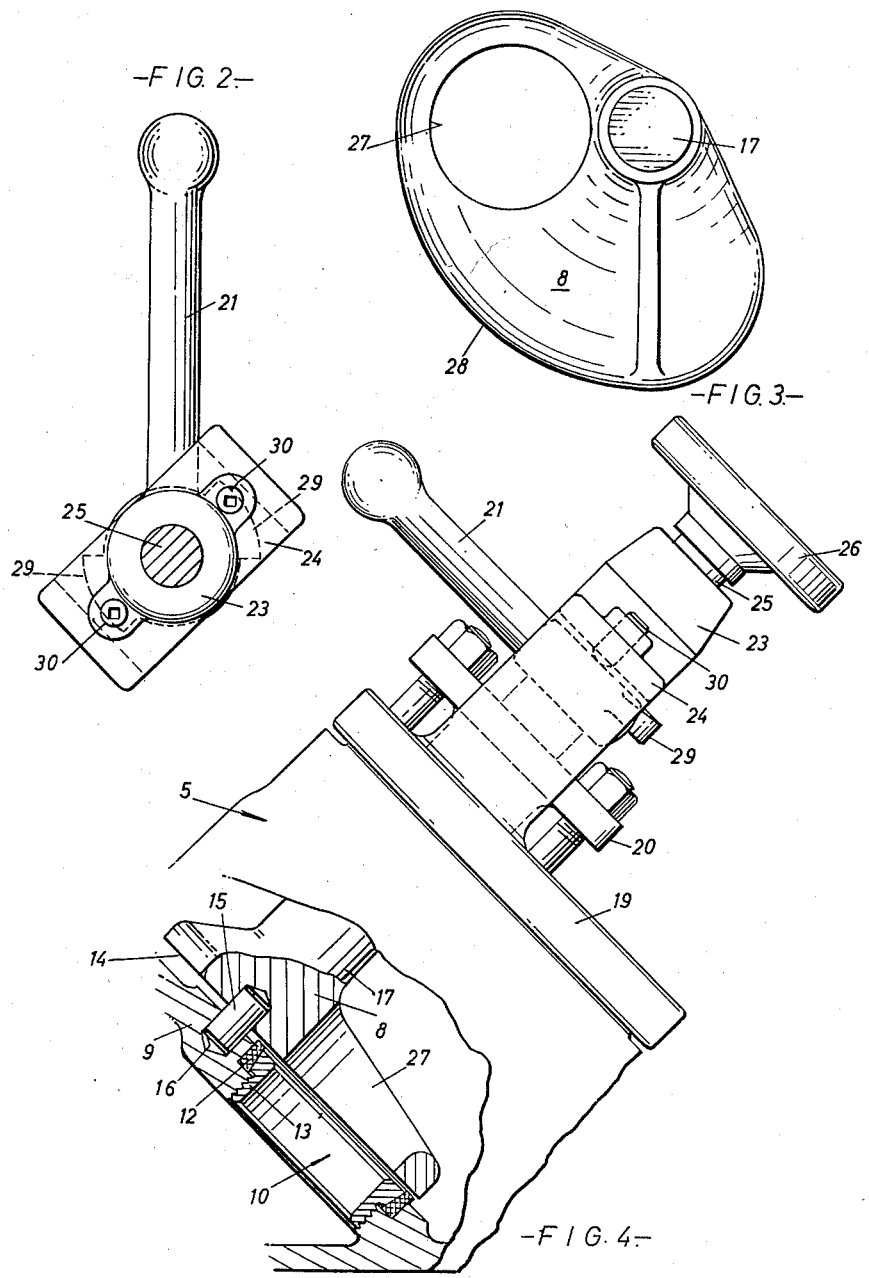
Inventor
Edward D. Fletcher
By
Attorney

United States Patent Office 2,925,247
Patented Feb. 16, 1960

2,925,247

VALVES

Edward Davison Fletcher, Heaton Norris, Stockport, England; Jane Davison Fletcher, executrix of said Edward Davison Fletcher, deceased Application August 22, 1956, Serial No. 605,602

Claims priority, application Great Britain August 30, 1955

2 Claims. (Cl. 251—192)

This invention relates to valves for controlling all types of liquid or gaseous fluids whether containing suspended solid matter or not, and whether above or below atmospheric pressure.

The desiderata for an efficient control valve are, that the full cross-sectional area of the closable orifice shall be available for fluid flow when necessary, that in passing through such orifice the fluid flow shall be deviated as little as possible, that the valve seat shall at all times be protected against disposition of solid matter thereon, and that at each operation of the valve the seating faces thereof shall be automatically wiped clear of any accumulation such as might otherwise hamper the fluid flow when the valve is open or impair the fluid-tightness of the valve when closed.

This automatic wiping action is at present obtainable only when the plug type of valve in which, however, the contacting surfaces of the plug and valve body are of such area, relatively to that of the orifice, that friction between them renders the valve difficult to operate. On the other hand, the screw-down type of valve, whilst easier to manipulate, has the drawback that its fluid-tightness when closed is readily impaired by the presence of solid matter between the seating faces.

The object of the present invention is to provide an improved construction of general-purpose control valve which combines the advantages of the plug and screw-down types without possessing any of their defects, and which incorporates a rotary closure element capable of being frictionally locked in any angular position, the gland associated with such member being also capable of being packed under pressure.

The parts of the improved valve hereinafter described are easy to produce in any suitable material, and the valve requires no maintenance except, very occasionally, the renewal of the seat, a further object of the invention being to enable such renewal to be carried out very simply and without the necessity of separating the valve from the associated pipe-line.

Yet other advantages of the invention will become apparent as the description proceeds.

According to this invention, the improved valve incorporates a flat-faced rotary closure element adapted to be maintained in contact with a raised seating about a flow orifice offset from the axis of rotation of said element, which latter is designed, in one extreme position, completely to cover the whole of said seating and orifice and, in the other extreme position, to expose the whole of said orifice without exposing said seating.

Preferably there is provided a pressure screw coaxial with the actuating spindle of the closure element and capable of being tightened to frictionally lock the latter at any point of its angular travel.

Furthermore the means for rotating the closure element may be associated with adjustable cam means whereby such element is positively displaced towards its seating during the latter part of the closing movement.

In the accompanying drawings,

Fig. 1 is a part-sectional side elevation of one form of the improved valve, shown in the closed position.

Fig. 2 is a fragmentary sectional plan view in the direction of the arrow X.

Fig. 3 is a plan view of the closure element shown in Fig. 1.

Fig. 4 is a fragmentary part-sectional valve corresponding to Fig. 1 but showing the valve fully open.

In the example illustrated, the valve body 5 is of Y form; that is to say, it provides opposed branches 6, 7, which may or may not be mutually aligned, and a rotary closure element 8 whose axis is inclined at, say, 45 degrees to the length of the branch 7.

The branches 6, 7 are separated by integral partition 9 disposed perpendicular to the axis aforesaid and formed with an offset circular flow orifice 10 whose centre may be arranged on the axes of both branches, 6, 7 (assuming the latter to be of circular cross-section) so that pressure drop through the fully-open orifice is negligible.

At the end remote from the branch 6, this flow orifice 10 is counterbored at 11 to receive a renewable annular seating 12 of metal, plastic, or other suitable material, the inner periphery of this seating being engaged by a retaining ring 13 screwed into the orifice 10 from the same end thereof, and one or both coacting surfaces of the seating 12 and retainer 13 being of frusto-conical form so that the seating 12 is radially compressed for frictional location in its socket 11'.

The outer end of the seating 12, which stands out from the partition 9 and may be bevelled to reduce its effective area, co-operates with the flat under face 14 of the closure element 8 which has a stub shaft 15 engaging a recess 16 in the partition 9 and a coaxial stem 17 which projects from the valve body 5 through an opening 18 large enough to permit its entry or withdrawal. This opening 18 is normally covered by a plate 19 secured to the valve body 5 by screws or bolts (not shown), and further positioned by means of dowels, a gland 20 accessible from the exterior of such plate preventing leakage around the valve stem 17.

The outer end of the latter has an actuating lever 21 fixed thereto and is pivotally located at 22 in a boss 23 on a bridge-piece 24 formed integrally with the exterior of the cover plate 19 and spanning the gland 20.

In this boss 23 there is mounted, coaxially with the valve stem 17, a pressure screw 25 rotatable by a hand-wheel 26 or the equivalent and serving to position the closure element's face 14 with reference to the valve seating 12, whilst being capable, when fully tightened, of frictionally locking the closure element 8 in any angular position to which it may be adjusted by means of the lever 21.

Preferably the closure element 8 is of generally sector shape, as shown in Fig. 3, one end of its working face 14 completely covering the flow orifice 10 and seating 12 when the valve is closed (Fig. 1), whilst the other end of such face has a circular hole 27 which, in the fully-open position of the valve (Fig. 4), exactly registers with the effective flow orifice 10 as defined by the inner periphery of the seating retainer 13.

The free edge 28 of the closure element 8 has an arcuate curvature concentric with the spindle 17 so that the entire periphery of the seating 12 is covered by such element except when the edge of the hole 27 in the latter is moving across the flow orifice 10.

Preferably the boss of the actuating lever 21 is formed with diametrically-opposed radial lugs 29 whose upper faces are inclined to the plane of movement of such lever, operation of the latter in a manner to close the valve causing these lugs 29 to exert a camming action upon adjustable ball-ended screws 30 carried by the crown of the bridgepiece 24 and so pressing the valve face 14 firmly against the seating 12 (see Figs. 1 and 2).

When the valve is being opened (i.e. by movement of the lever 21 to the position indicated in broken lines in Fig. 2) the lugs 29 are brought clear of their adjustable abutments 30, thus relaxing the pressure on the closure element 8 and allowing the latter to ease itself from the seating 12 under the influence of the inlet pressure, until either the lever 21 abuts the crown of the bridgepiece 24 (Fig. 4) or a shoulder 31 on the closure element 8 co-operates with the inner end of the gland housing 32.

It will be appreciated that, during the latter part of its closing movement and the initial part of its opening movement, the element 8 continuously wipes the seating 12 so as positively to eliminate any risk of solid matter entering between the coacting surfaces.

Owing to the automatic relaxation of the seating pressure as above described and the relatively small contact area of the seating 14, the valve is exceedingly easy to operate in either direction and despite the fact that it is capable of being frictionally locked in any position by means of the pressure screw 25 and automatically locked in the closed position by means of the adjustable camming action aforesaid.

Sufficient length of actuating stem 17 is exposed between the plate 19 and the crown of the bridgepiece 24 to allow of the gland 20 being withdrawn, and if the branch 6 be used as the inlet fresh packing may be inserted at 33 without leakage so long as the closure element 8 is screwed tightly against its seating 12.

The valve, which may be steam-jacketed if desired, incorporates no part liable to seizure at high temperatures, and obviously it may be designed with two or more flow orifices 10 instead of one, and/or with the axis of the closure element 8 at right angles or parallel to the direction of the inlet and/or outlet branch.

I claim:

1. A valve comprising a body having aligned inlet and exit openings therein for flow of fluid therethrough, a partition in said body between said openings having a flow orifice therein and at an angle to the centerline of said openings, a valve stem pivotally mounted in said body, a valve closure secured to the inner end of said stem, said valve closure being eccentrically mounted relative to said flow orifice, said valve having a hole therein corresponding to said flow orifice the area of said valve closure being such that when said orifice and hole are in register said flow orifice is substantially uncovered, and when said orifice and hole are out of register said valve closure covers the whole of said orifice, a valve seat around said orifice and extending above the surface of said partition, said valve stem projecting from said body through an opening of sufficient size to permit the passage of said valve closure therethrough, a closure for said opening having a gland, said stem projecting through said gland, said closure carrying a bridging member, said member having a crown portion carrying a pressure screw coaxial with said stem and capable of frictionally locking said closure element at any point of its angular travel, said valve stem having adjustable cam means cooperating with abutment means on said member adapted to displace positively the valve closure towards said seat on movement of said valve closure towards the closed position.

2. A valve according to claim 1 wherein said cam means comprises diametrically opposed radial lugs on an actuating lever fixed to said stem, and said abutment means comprises ball-ended screws.

References Cited in the file of this patent

UNITED STATES PATENTS

| | | |
|---|---|---|
| 157,628 | Morgenstern | Dec. 8, 1874 |
| 590,728 | Moffatt | Sept. 28, 1897 |
| 973,075 | Schlemmer | Oct. 18, 1910 |
| 1,214,645 | Boyden | Feb. 6, 1917 |
| 1,280,177 | Davies | Oct. 1, 1918 |
| 1,311,585 | Baird | July 29, 1919 |
| 1,467,816 | Rope | Sept. 11, 1923 |
| 1,617,503 | Seymour | Feb. 15, 1927 |
| 2,209,992 | McGill | Aug. 6, 1940 |
| 2,498,396 | Cunningham | Feb. 21, 1950 |
| 2,636,713 | Hamer | Apr. 28, 1953 |
| 2,772,068 | Grove | Nov. 27, 1956 |

FOREIGN PATENTS

| | | |
|---|---|---|
| 4,855 | Great Britain | Feb. 26, 1902 |
| 6,465 | Great Britain | Apr. 17, 1884 |